United States Patent [19]

Cau

[11] Patent Number: 5,134,527
[45] Date of Patent: Jul. 28, 1992

[54] SUSPENSION MECHANISM FOR AN OBJECTIVE LENS OF AN OPTICAL HEAD

[75] Inventor: Cwo-Bau Cau, Hsinchu, Taiwan

[73] Assignee: Industrial Technology Research Institute, Hsinchu, Taiwan

[21] Appl. No.: 514,224

[22] Filed: Apr. 25, 1990

[51] Int. Cl.⁵ .......................... G02B 7/02; G11B 7/00
[52] U.S. Cl. ........................ 359/824; 359/823; 369/44.16
[58] Field of Search ........................ 350/245–258; 360/104, 105; 359/811–830; 369/44.11–44.19, 44.21–44.24

[56] References Cited

U.S. PATENT DOCUMENTS

| | | | |
|---|---|---|---|
| 4,349,851 | 9/1982 | Higashiyama et al. | 360/104 |
| 4,696,566 | 9/1987 | Sekimoto et al. | 350/255 |
| 4,813,033 | 3/1989 | Baasch et al. | 350/255 |
| 4,818,066 | 4/1989 | Nose | 350/247 |
| 4,878,214 | 10/1989 | Hinotani | 350/247 |
| 4,887,888 | 12/1989 | Nose | 350/247 |
| 4,960,321 | 10/1990 | Takahashi | 350/247 |
| 4,988,165 | 1/1991 | Ishii et al. | 350/247 |

FOREIGN PATENT DOCUMENTS

| | | | |
|---|---|---|---|
| 382553 | 8/1990 | European Pat. Off. | 369/44.15 |
| 85639 | 5/1986 | Japan | 369/44.16 |
| 142534 | 6/1988 | Japan | 369/44.15 |
| 200324 | 8/1988 | Japan | 369/44.16 |

Primary Examiner—Paul M. Dzierzynski
Assistant Examiner—Thong Nguyen
Attorney, Agent, or Firm—Cushman, Darby & Cushman

[57] ABSTRACT

This invention discloses a suspension mechanism for an objective lens of an optical head accommodated within an optical disk drive. In a first embodiment, the suspension mechanism of this invention is a combination of a rectangular leaf spring and a butterfly-shaped leaf spring, the butterfly-shaped spring being orthogonal to the rectangular leaf spring. A second embodiment is a combination of a "V" shaped leaf spring and a rectangular leaf spring. A third embodiment is a combination of two rectangular leaf springs comprising a "V" shaped structure. These three different embodiments are used to rotatably support the objective lens seat to facilitate a tracking operation of the objective lens.

3 Claims, 5 Drawing Sheets

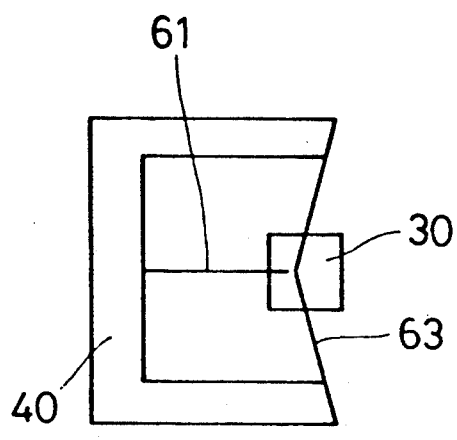
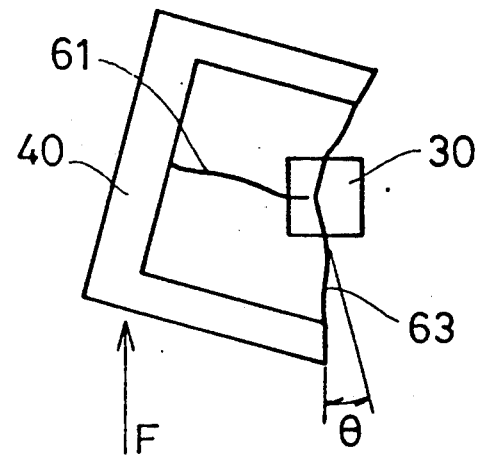
FIG. 8          FIG. 9
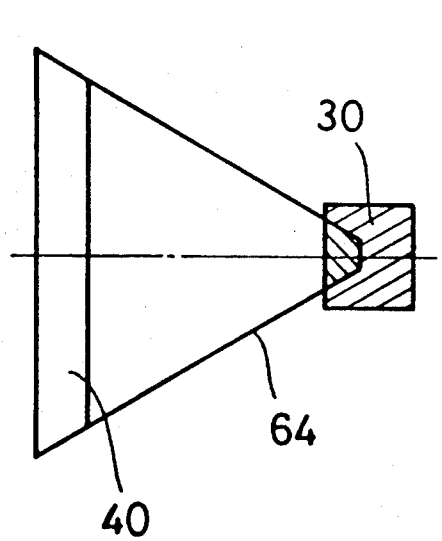
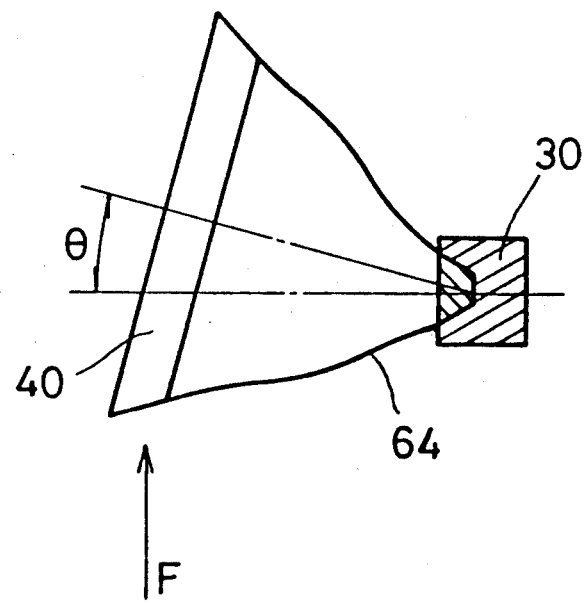
FIG. 10         FIG. 11

SUSPENSION MECHANISM FOR AN OBJECTIVE LENS OF AN OPTICAL HEAD

BACKGROUND OF THE INVENTION

The present invention relates generally to a suspension mechanism, particularly to a suspension mechanism for an objective lens of an optical head accommodated within an optical disk driver.

During operation, an objective lens of an optical head must be operated to track the tracks of an optical disk and focus laser beams on the optical disk to facilitate reading information from the optical disk or writing information into the optical disk. However, to track the tracks of an optical disk, the objective lens must be driven to swing back and forth on a plane parallel to the surface of the optical disk. Similarly, to focus laser beams on an optical disk, the objective lens must be driven to approach or move away from the optical disk.

The conventional mechanism for tracking the tracks of an optical disk or focusing laser beams on an optical disk is shown in FIGS. 1 and 2. An objective lens 10 mounted on an objective lens seat 11 is suspended on a rotation beam 13 by means of four thin parallel leaf springs 12. A shaft 14 is mounted on the central portion of the rotation beam 13, and a lower bearing 15b for rotatably supporting the shaft 14 is mounted on a base 16. Furthermore, an upper bearing 15a is mounted on the upper portion of the shaft 14 to cooperate with the lower bearing 15b to rotatably support the shaft 14. The upper bearing 15a is urged downward by one end portion of a leaf spring 18, while the other end portion of the leaf spring 18 is secured to the top portion of the "L" shaped base 16 by means of a plate 17. With this arrangement, the shaft 14 can be held upright. Also, two pairs of coils 19a and 19b, orthogonal to each other, are secured to the four sides of the objective lens seat 11. When electric currents pass through the coils 19a or 19b, the magnetic forces produced between the coils 19a, 19b and permanent magnets (not shown) fixed on the base 16 will drive the objective lens seat 11 together with the objective lens 10 to swing around the shaft 14, that is, to move in the direction of the arrow AA' to facilitate a tracking operation of the objective lens 10, or to move up and down to facilitate a focusing operation of the objective lens 10.

In the above-described mechanism, the tracking operation of the objective lens 10 is accomplished by rotational movements of the rotation beam 13, that is, rotational movements of the shaft 14 relative to the base 13. However, the shaft 14 is supported by the bearings 15a, 15b, and frictional forces induced at the beginning of rotation movements of the bearings 15a, 15b will greatly reduce the responsiveness of the whole mechanism. Furthermore, the precise positioning of the objective lens 10 will be affected, because of the friction of the bearings 15a, 15b. Also, the roughness of the surfaces of the rollers and the raceway of the bearings will inevitably induce noises into output signals of the whole system.

SUMMARY OF THE INVENTION

The primary object of the present invention is to provide a suspension mechanism for an objective lens of an optical head, which enables the tracking operation and the focusing operation of the objective lens to be accomplished smoothly.

It is another object of this invention to provide a suspension mechanism for an objective lens of an optical head, which has simple structures.

It is another object of this invention to provide a suspension mechanism for an objective lens of an optical head, which can enhance the responsiveness of an objective lens during the tracking operation.

In accordance with the present invention, a suspension mechanism for an objective lens of an optical head comprises: an objective lens seat having an objective lens mounted thereon, one pair of focusing coils; one pair of tracking coils; a base; one pair of permanent magnets mounted on the base and adjacent to the focusing coils, for producing magnetic forces on the focusing coils when an electric current is supplied to the focusing coils; a second pair of permanent magnets mounted on the base and adjacent to the tracking coils, for producing magnetic forces on the tracking coils when an electric current is supplied to the tracking coils; a central pillar mounted to the base; a counter balance seat connected to the central pillar by means of a combination of leaf springs such that it is easier to swing the counter balance seat about the central pillar on a plane perpendicular to the axis of the objective lens than the plane parallel to the axis of the objective lens, a second combination of leaf springs connecting the counter balance seat and the objective lens seat such that it is easier to move the objective lens seat along the axis of the objective lens than the axis perpendicular to the axis of the objective lens when electric currents pass through the tracking coils or the focusing coils, the objective lens seat will be forced to swing about the central pillar or to move along the axis of the objective lens.

BRIEF DESCRIPTION OF THE DRAWINGS

The present invention can be more fully understood by reference to the following description and accompanying drawings, which form an integral part of this application:

FIG. 8 is a simplified diagram showing another construction of the track leaf spring system used in the second preferred embodiment of the suspension mechanism of this invention.

FIG. 9 is a simplified diagram showing the deflected states of the track leaf spring system shown in FIG. 8.

FIG. 10 is a simplified diagram showing another construction of the track leaf spring system used in the third preferred embodiment of the suspension mechanism of this invention.

FIG. 11 is a simplified diagram showing the deflected states of the track leaf spring system shown in FIG. 10.

DETAILED DESCRIPTION OF THE PREFERRED EMBODIMENTS

Figure 1:
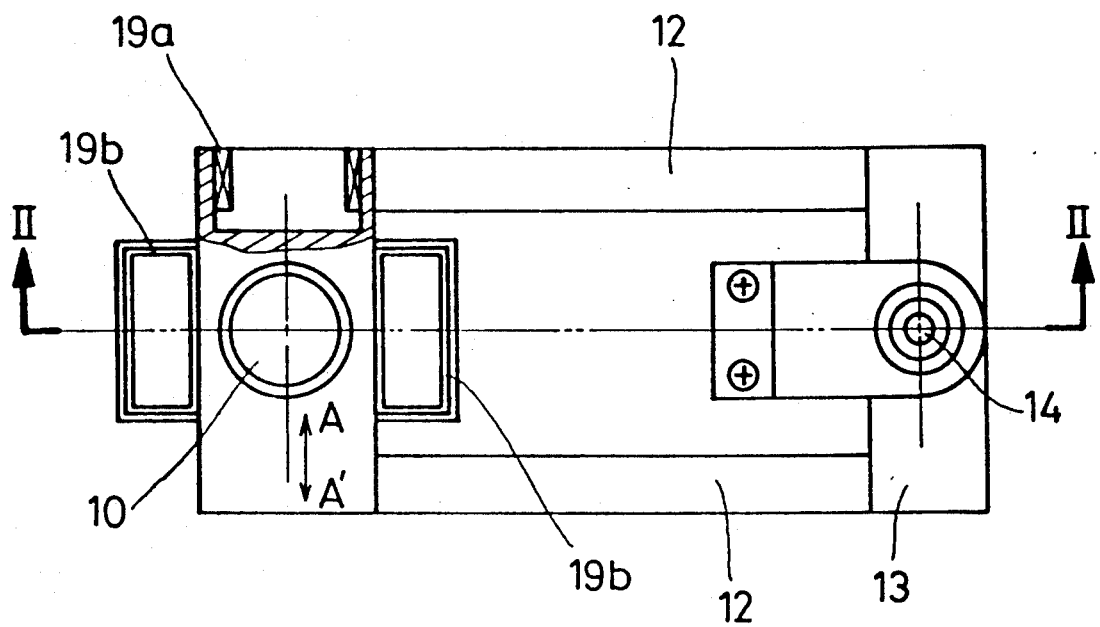
FIG. 1 is a top view showing the construction of a conventional suspension mechanism for an objective lens of an optical head.
Figure 2:
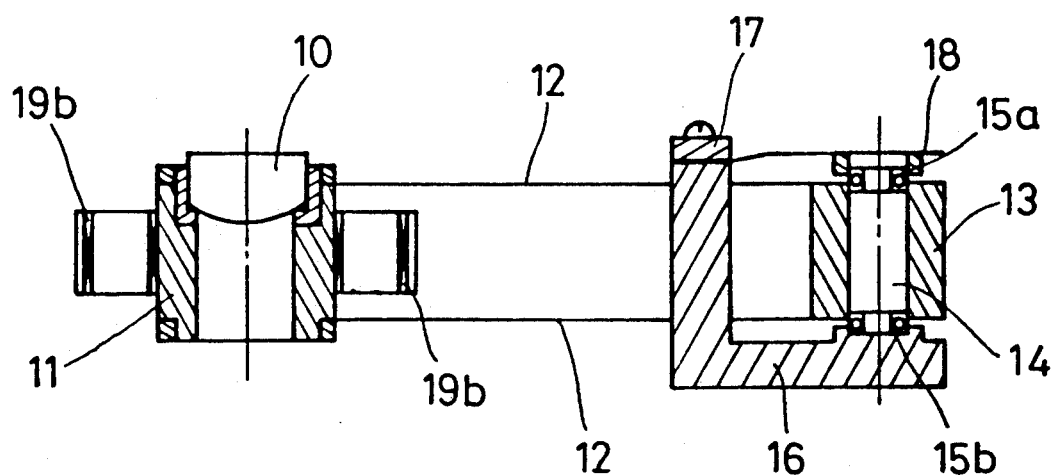
FIG. 2 is a cross-sectional view along the line II—II in FIG. 1.
Figure 3:
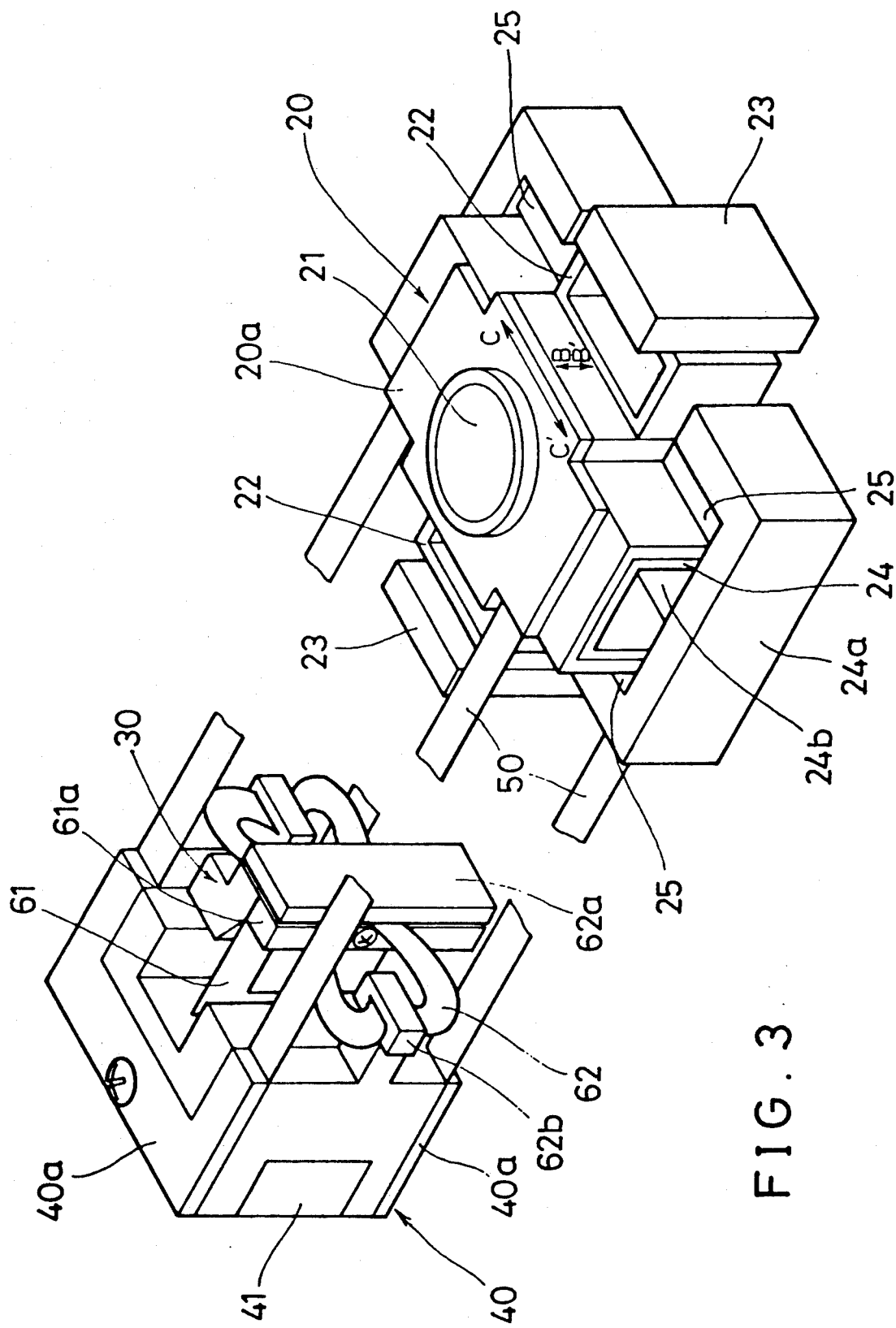
FIG. 3 is a broken perspective view showing the first preferred embodiment of the suspension mechanism according to this invention, whose base is removed.

As shown in FIG. 3, the suspension mechanism of this invention comprises an objective lens seat 20; a central pillar 30; a counter balance seat 40 having a weight 41 mounted therein; four focus leaf springs 50 connecting the objective lens seat 20 and the counter balance seat 40; a rectangular leaf spring 61 connecting the counter balance seat 40 and the central pillar 30; and a butterfly-shaped leaf spring 62 connecting the counter balance seat 40 and the central pillar 30. The butterfly-shaped leaf spring 62 is disposed in such a way that it is orthogonal to the rectangular leaf spring 61. Two end portions of each focus leaf spring 50 are respectively secured to the objective lens seat 20 and the counter balance seat 40 by means of lap plates 20a and lap plates 40a. One end portion of the rectangular leaf spring 61 is secured to the central pillar 30 by means of a lap plate 61a, and the other end portion of the rectangular leaf spring 61 is inserted into the counter balance seat 40 and fixed thereon. The middle portion of the butterfly-shaped leaf spring 62 is secured to the central pillar 30 by means of the lap plate 62a, and two end portions of the butterfly-shaped leaf spring 62 are respectively secured to the counter balance seat 40 by means of the lap plates 62b. With this arrangement, the objective lens seat 20 is suspended by the focus leaf springs 50 on the counter balance seat 40, and the counter balance seat 40 is suspended by the rectangular leaf spring 61 and the butterfly-shaped leaf spring 62 on the central pillar 30, that is, both of the objective lens seat 20 and the counter balance seat 40 are suspended on the central pillar 30. Thus, the objective lens seat 20 and the counter balance seat 40 are capable of being driven (described hereinafter) to move, relative to the base 70. The base 70 is capable of being driven by a drive device (not shown) to move reciprocally along a radius of an optical disk mounted on its operation location to facilitate the (long) tracking operation of the objective lens 21.

Figure 4:
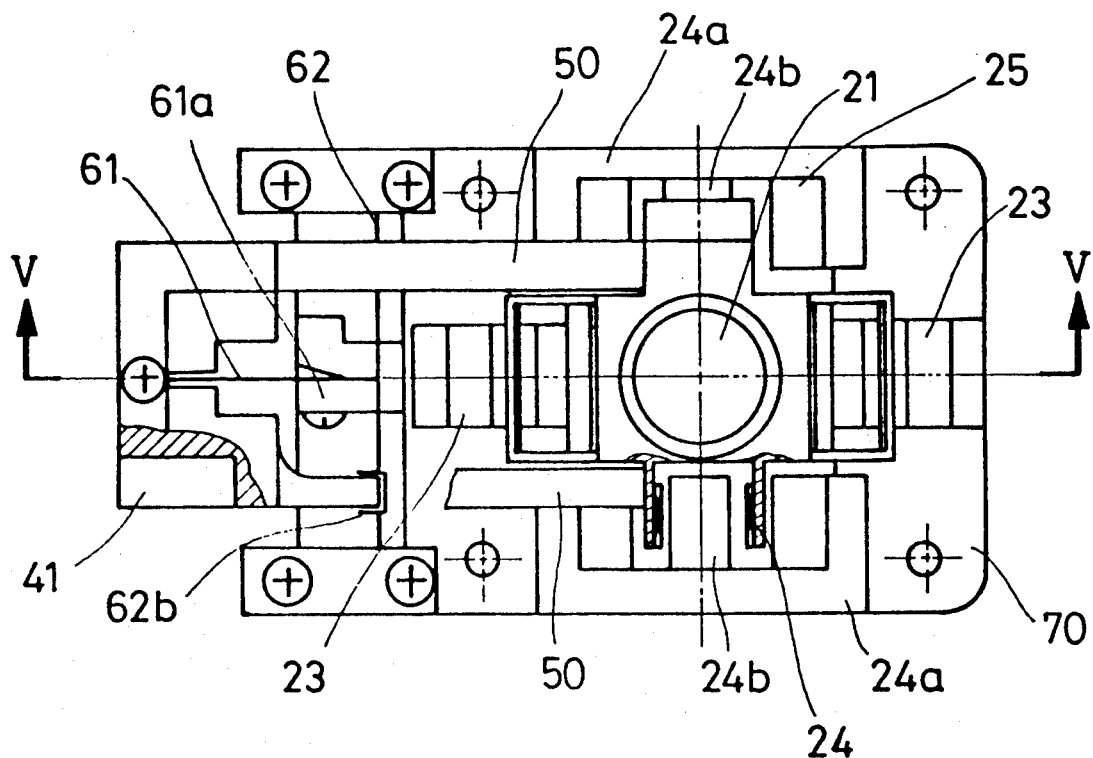
FIG. 4 is a top view with partly broken portions showing the suspension mechanism of this invention shown in FIG. 3.
Figure 5:
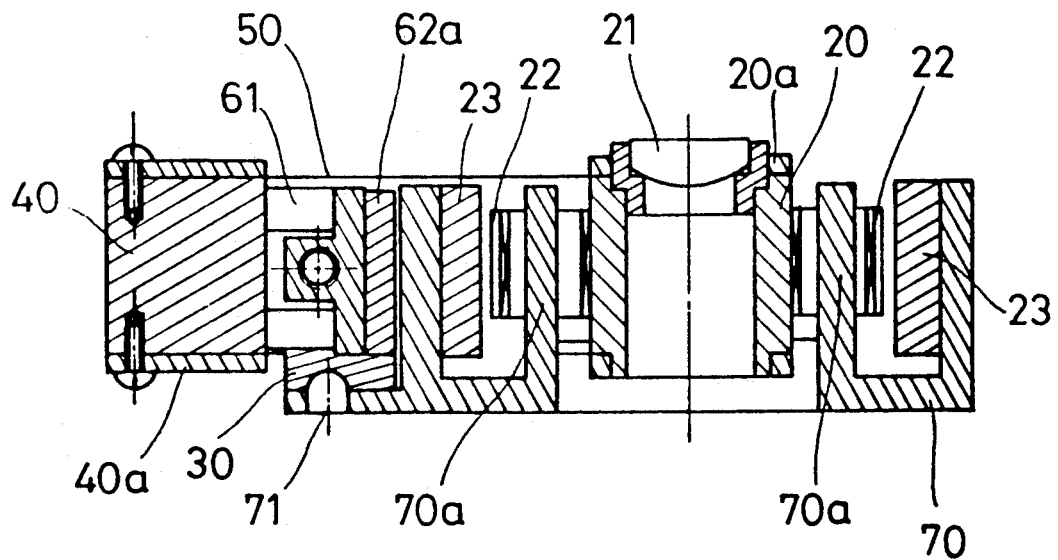
FIG. 5 is a cross-sectional view along the line V—V in FIG. 4.

As shown in FIG. 3, one pair of focusing coils 22 are respectively fixed to the side wall of the objective lens seat 20, and one pair of tracking coils 24 are respectively secured to the walls of the objective lens seat. Furthermore, one pair of permanent magnets 23 are disposed adjacent to the focusing coils 22 so that, when electric currents pass through the focusing coils 22, the magnetic forces will be applied on the focusing coils and this force will drive the objective lens seat 20 together with the objective lens 21 to move upward or downward (or to move in the direction of the arrow BB'). Similarly, one pair of permanent magnets 25 are disposed adjacent to the tracking coils 24 to drive the objective lens seat 20 to swing about the central pillar 30 (or to move in the direction of the arrow CC'). As shown in FIG. 4, one pair of permeable cores 24b integrally formed with the "E" shaped permeable elements 24a are respectively disposed within the tracking coils 24, the permeable elements 24a being secured to the base 70. Similarly, as shown in FIG. 5, permeable cores 70a integrally formed with the base 70 extended respectively through the focusing coils 22.

The following is a description of the operation of the suspension mechanism described above.

As shown in FIG. 3, as the weight 41 is disposed on the counter balance seat 40, the counter balance seat 40 will keep a torque balance with the objective lens seat 20 to hold the counter balance seat 40 and the objective lens seat 20 in an equilibrium suspended state when no electric current passes through the focusing coils 22 or the tracking coils 24. When electric currents pass through the focusing coils 22, the magnetic forces are applied on the focusing coils 22 and force the objective lens seat 20 together with the objective lens 21 to move upward or downward in the direction of the arrow BB'. Under this circumstance, because the objective lens seat 20 is suspended by the focusing leaf springs 50, the focusing leaf springs 50 will be bent as cantilevers to let the objective lens seat 20 move, relative to the base 70, upward or downward to facilitate the focusing operation of the objective lens 21. It should be noted that the focusing leaf springs 50 are disposed such that they are easier to bend upward or downward (in the direction of the arrow BB') than to bend side to side (in the direction of the arrow CC'). This is because the thickness of the springs 50 in a plane perpendicular to the objective lens axis is substantially less than the width of the springs 50 in a plane parallel to the objective lens axis. Therefore, the bending moment of the springs 50 is substantially less in a plane perpendicular to the objective lens axis than in a plane parallel to the objective lens axis.

Similarly, the rectangular leaf spring 61 and the butterfly-shaped leaf spring 62 deflect much easier in the direction of the arrow CC'than in the direction of the arrow BB' because the thickness of the springs 61 and 62 and thus the bending moment is less in a plane parallel to the optical axis than in a plane perpendicular to the optical axis. Thus, when electric currents pass through the focusing coils 22, the rectangular leaf spring 61 and the butterfly-shaped leaf spring 62 deflect only slightly or not at all in a BB' direction, in comparison to the deflection of the focusing leaf springs 50. Likewise, when electric currents pass through the tracking coils 24, the focusing leaf springs 50 deflect only slightly or not at all in a CC' direction, in comparison to rectangular leaf spring 61 and the butterfly-shaped leaf spring 62. In other words, leaf springs 50 deflect substantially independently of leaf springs 61 and 62 in a BB' direction and leaf springs 61 and 62 deflect substantially independently of leaf springs 50 in a CC' direction.

According to this invention, instead of a bearing, a combination of the rectangular leaf spring and the butterfly-shaped leaf spring is used to rotatably support the objective lens seat to facilitate the tracking operation of the objective lens.

Furthermore, when the deflection angle is small, the deflection of the combination of the rectangular leaf spring and the butterfly-shaped leaf spring is approximately linear, and the movement of the objective lens is smooth.

Figure 7:
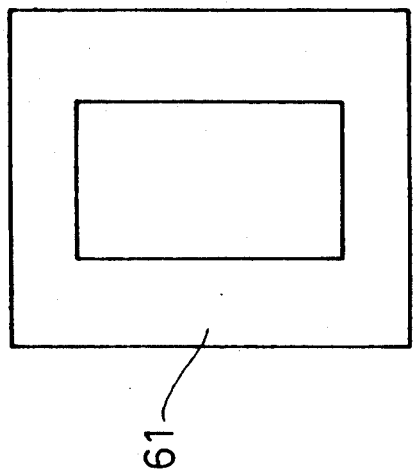
FIG. 7 is a top view showing a rectangular leaf spring used in the suspension mechanism of this invention shown in FIG. 3.
Figure 6:
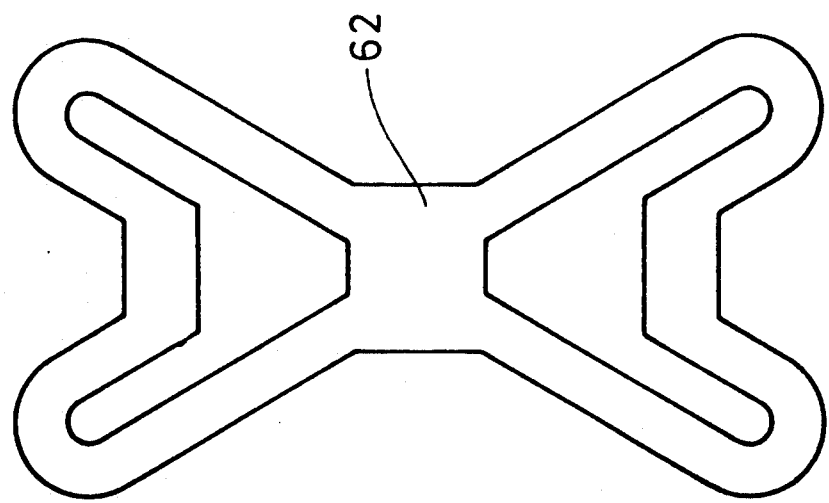
FIG. 6 is a top view showing a butterfly-shaped leaf spring used in the suspension mechanism of this invention shown in FIG. 3.

It should be noted that the rectangular leaf spring shown in FIG. 7 and the butterfly-shaped leaf spring shown in FIG. 6 are used in the above embodiment, however, the combination of leaf springs for the tracking operation is not limited to the above disclosed one. Instead of a butterfly-shaped leaf spring, a "V" shaped leaf spring 63 as shown in FIG. 8 can also be used. The combination of a "V" shaped leaf spring and a rectangular leaf spring can also obtain the tracking function like the combination of a butterfly-shaped spring and a rectangular leaf spring. Besides, instead of the combination of the rectangular leaf spring shown in FIG. 7 and the butterfly-shaped leaf spring shown in FIG. 6, a combination of only two rectangular leaf springs comprising a "V" shaped leaf spring 64 as shown in FIG. 10 can be enough. As is easily seen in FIGS. 8 and 10, the V-shaped leaf springs are positioned perpendicular to the base and have a bisector of an angle formed by the two legs of the V being generally parallel to a longitudinal axis of the suspension mechanism. FIG. 9 is a simplified diagram showing the deflected states of the track leaf spring system shown in FIG. 8 when a force "F" is applied. FIG. 11 is a simplified diagram showing the deflected states of the track leaf spring system shown in FIG. 10 when a force "F" is applied.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A suspension mechanism for an objective lens of an optical head, comprising:
   an objective lens seat having an objective lens mounted thereon;
   one pair of focusing coils secured to said objective lens seat;
   one pair of tracking coils secured to said objective lens seat;
   a base;
   one pair of permanent magnets mounted on said base and being adjacent to said focusing coils, for producing magnetic forces on said focusing coils when an electric current is supplied to the focusing coils;
   one pair of second permanent magnets mounted on said base and being adjacent to said tracking coils, for producing magnetic forces on said tracking coils when an electric current is supplied to the tracking coils;
   a central pillar mounted to said base;
   a counter balance seat movable with respect to said base connected to said central pillar by a tracking spring assembly including a V-shaped leaf spring positioned perpendicular to the base and having a bisector of an angle formed by the two legs of the V-shaped leaf spring being generally parallel to a longitudinal axis of the suspension mechanism, the tracking spring assembly being more easily deformable in a plane perpendicular to an axis of the objective lens than in a plane parallel to the objective lens axis such that passing an electric current through said tracking coils causes said objective lens and counter balance seat to pivot about said central pillar in a plane perpendicular to said objective lens axis; and
   a combination of focusing leaf springs connecting said counter balance seat to said objective lens seat, the combination of focusing leaf springs more easily deformably in a plane parallel to the objective lens axis than in a plane perpendicular to the objective lens axis such that passing an electric current through said focusing coils causes said objective lens to move along said objective lens axis.

2. A suspension mechanism as claimed in claim 1, wherein said tracking spring assembly further comprises a rectangular leaf spring disposed perpendicularly to the base.

3. A suspension mechanism for an objective lens of an optical head, comprising:
   an objective lens seat having an objective lens mounted thereon;
   one pair of focusing coils secured to said objective lens seat;
   one pair of tracking coils secured to said objective lens seat;
   a base;
   one pair of permanent magnets mounted on said base and being adjacent to said focusing coils, for producing magnetic forces on said focusing coils when an electric current is supplied to the focusing coils;
   one pair of second permanent magnets mounted on said base and being adjacent to said tracking coils, for producing magnetic forces on said tracking coils when an electric current is supplied to the tracking coils;
   a central pillar mounted to said base;
   a counter balance seat movable with respect to said base connected to said central pillar by a combination of a butterfly-shaped leaf spring and a rectangular leaf spring disposed orthogonally to each other and perpendicular to the base, the butterfly shaped spring and rectangular spring combination being more easily deformable in a plane perpendicular to an axis of the objective lens than in a plane parallel to the objective lens axis such that passing an electric current through said tracking coils causes said objective lens and counter balance seat to pivot about said central pillar in a plane perpendicular to said objective lens axis; and
   a combination of focusing leaf springs connecting said counter balance seat to said objective lens seat, the combination of focusing leaf springs more easily deformable in a plane parallel to the objective lens axis than in a plane perpendicular to the objective lens axis such that passing an electric current through said focusing coils causes said objective lens to move along said objective lens axis.

* * * * *